US010065699B2

(12) United States Patent
Wada et al.

(10) Patent No.: US 10,065,699 B2
(45) Date of Patent: Sep. 4, 2018

(54) FUEL TANK FOR MOTORCYCLE

(71) Applicant: Kawasaki Jukogyo Kabushiki Kaisha, Kobe-shi, Hyogo (JP)

(72) Inventors: Hiroyuki Wada, Kobe (JP); Takeshi Kashihara, Rayong (TH)

(73) Assignee: KAWASAKI JUKOGYO KABSUHIKI KAISHA (JP)

( * ) Notice: Subject to any disclaimer, the term of this patent is extended or adjusted under 35 U.S.C. 154(b) by 112 days.

(21) Appl. No.: 15/234,376

(22) Filed: Aug. 11, 2016

(65) Prior Publication Data

US 2016/0347394 A1 Dec. 1, 2016

Related U.S. Application Data

(63) Continuation of application No. PCT/JP2015/053050, filed on Feb. 4, 2015.

(30) Foreign Application Priority Data

Mar. 17, 2014 (JP) ................. 2014-053629

(51) Int. Cl.
*B60K 15/03* (2006.01)
*B62J 35/00* (2006.01)

(52) U.S. Cl.
CPC .................... *B62J 35/00* (2013.01)

(58) Field of Classification Search
CPC . B62J 35/00; B60P 3/22; B60K 15/03; B60K 5/073
USPC ................................ 280/833, 834
See application file for complete search history.

(56) References Cited

U.S. PATENT DOCUMENTS

| 6,105,701 | A | 8/2000 | Buell |
| 6,213,514 | B1 | 4/2001 | Natsume et al. |
| 6,971,659 | B2 | 12/2005 | Uemoto et al. |
| 7,390,023 | B2 | 6/2008 | Hirose et al. |
| 2002/0020573 | A1 | 2/2002 | Fournier et al. |
| 2005/0023817 | A1 | 2/2005 | Uemoto et al. |
| 2005/0110265 | A1 | 5/2005 | Miyakozawa et al. |
| 2006/0108369 | A1 | 5/2006 | Hirose et al. |

FOREIGN PATENT DOCUMENTS

| EP | 0849149 | 6/1998 |
| EP | 1659054 | 5/2006 |
| EP | 2383174 | 11/2011 |

(Continued)

OTHER PUBLICATIONS

International Preliminary Report on Patentability in PCT/JP2015/053050; dated Sep. 29, 2016; 5 pages.

(Continued)

*Primary Examiner* — Stephen Castellano

(57) ABSTRACT

A fuel tank disposed between a head pipe and a rider's seat is provided, which includes a pair of grooved portion that are positioned on a top surface in symmetrical relation with respect to a longitudinal center plane. The pair of the grooved portions are positioned rearwardly of a tank top portion, each so formed as to have a transverse sectional shape that is represented by a smooth curved line. The grooved portions are parallel to the longitudinal center plane or inclined to extend with a distance therebetween gradually decreasing towards a rear, the distance being set to be within the range of 0.25 to 0.40 at a front end of each of the grooved portions and within the range of 0.08 to 0.35 at a rear end thereof.

11 Claims, 5 Drawing Sheets

(56) References Cited

FOREIGN PATENT DOCUMENTS

| JP | 59 106380 | 6/1984 |
|----|-----------|--------|
| JP | 62-184087 | 11/1987 |
| JP | 63-046984 | 2/1988 |
| JP | 06-239278 | 8/1994 |
| JP | 10-181658 | 7/1998 |
| JP | 2005-053299 | 3/2005 |
| WO | WO2004/110851 | 12/2004 |

OTHER PUBLICATIONS

Extended and Supplementary Search Report dated Oct. 9, 2017 for Corresponding European Patent Application No. 15765058.1, 9 pages.
International Search Report with English Language Translation for PCT/JP2015/053050, filed Feb. 4, 2015 (4 pages).

FUEL TANK FOR MOTORCYCLE

CROSS REFERENCE TO THE RELATED APPLICATION

This application is a continuation application, under 35 U.S.C § 111(a) of international patent application No. PCT/JP2015/053050, filed Feb. 4, 2015, which claims priority to Japanese patent application No. 2014-053629, filed Mar. 17, 2014, the entire disclosure of which is herein incorporated by reference as a part of this application.

BACKGROUND OF THE INVENTION

Field of the Invention

The present invention relates to a fuel tank for use in a motorcycle that is positioned between a head pipe and a rider's seat.

Description of Related Art

Hitherto, a fuel tank generally used in a motorcycle has been known, in which, in order to increase the tank capacity, a tank upper surface is substantially bulged upwardly to represent a well rounded shape. In such case, in order to enhance an aesthetic feature, a rear half portion of the tank upper surface which is flattened to represent a flat surface has been made available. Also, as another fuel tank, the fuel tank has been known, in which a recessed portion in the form of a groove is formed in a widthwise intermediate portion of the tank upper surface so as to extend in a tank longitudinal direction while having a relatively large width, say, 50 to 80% of the tank maximum width (such as disclosed in the patent document 1 listed below).

PRIOR ART DOCUMENT

Patent Document 1: JP Laid-open Patent Publication No. 2005-053299

It has, however, been found that the fuel tank of a type in which the rear half portion of the tank upper surface is formed as a flat surface, as compared with the fuel tank of a type in which the tank upper surface is bulged upwardly to represent a well rounded shape, has a decreased tank capacity and, also a lowered rigidity to such an extent as to allow the tank upper surface to be susceptible to the resonance phenomenon attributable to vibrations induced during the travelling. On the other hand, in the case of the fuel tank of the type in which the recessed portion of the relatively large width is formed in the tank upper surface such as disclosed in the patent document 1 referred above, the tank capacity is reduced in a quantity comparable to the recessed portion employed. In addition, since a substantially entire bottom surface of the recessed portion is formed as the flat surface as discussed above, the rigidity is lowered, and also it is not preferable in terms of the aesthetic feature.

SUMMARY OF THE INVENTION

The present invention has been devised with due consideration paid to the foregoing problems and inconveniences inherent in the prior art and is therefore intended to provide a fuel tank for use in a motorcycle of a type in which both a desired tank capacity and a desired rigidity can be secured and which is not impaired in terms of the aesthetic feature.

In order to accomplish the foregoing object, a fuel tank for use in a motorcycle of the present invention is disposed between a head pipe and a rider's seat and includes a top surface including a pair of grooved portions positioned symmetrically relative to a longitudinal center plane. The pair of the grooved portions are positioned rearwardly of a tank top portion and have a transverse sectional shape depicted by a smoothly curved line. The grooved portions are formed to extend parallel to the longitudinal center plane or to extend so as to incline relative to the longitudinal center plane with a distance W1 gradually decreasing in a rearward direction. Specifically, the distance W1 between the neighboring grooved portions is chosen to be within the range of 0.25 to 0.40 times a tank maximum tank width Wm at front ends of those grooved portions and within the range of 0.08 to 0.35 times the tank maximum tank width Wm at rear ends of those grooved portions.

According to the fuel tank designed in accordance with the present invention, thanks to the pair of the grooved portion that extend substantially in a forward and rearward direction or longitudinal direction, the rigidity is increased and, hence, generation of the resonance phenomenon in a tank upper surface, which may be brought about by vibrations induced during the travelling, can be effectively suppressed. Also, since reduction of the tank capacity is not so much as compared with the case in which a single recessed portion of a large width is formed, it is easy to obtain a desired tank capacity. In addition, since the pair of the grooved portions are formed at a location rearwardly of the tank top portion, the rigidity at the location rearwardly of the tank top portion is maintained, and also, the aesthetic aspect of the motorcycle can be enhanced by forming the rear location in the form of a flat surface.

Also, the distance W1 between the pair of the grooved portions is so set as to be within the range of 0.25 to 0.40 times the tank maximum width Wm at the front ends of the grooved portions and within the range of 0.08 to 0.35 times the tank maximum width Wm at the rear end of the grooved portions, and therefore, increase of the rigidity can be achieved. In other words, if the distances W1 of the grooved portions is less than 0.25 times the tank maximum width Wm at the front ends or less than 0.08 times the tank maximum width at the rear ends, the distances W1 are too small enough to increase a surface other than that and, therefore, the rigidity of that surface does not increase. On the other hand, if the distances W1 exceeds the 0.40 times the tank maximum width Wm at the front ends or exceeds 0.30 times the tank maximum width at the rear ends, the distances W1 are too large and, therefore, at the grooved portion where the tank capacity is not caused to decrease, the rigidity of the fuel tank will not increase sufficiently. Yet, since the pair of the grooved portions are each formed so as to have a transverse sectional shape represented by a smoothly curved line, there is no possibility that the outer appearance will not be impaired. It is to be noted that the transverse sectional shape referred to above and hereinafter should be understood as meaning a sectional shape extending in a motorcycle widthwise direction and cut along a plane perpendicular to the tank top surface.

In the practice of the present invention, each of the grooved portions is preferably inclined at an angle of inclination within the range of 5 to 15° relative to the longitudinal center plane when viewed in a top plane view. It is to be noted that the wording "when viewed in a top plane view" referred to hereinabove and hereinafter is to be understood that the fuel tank in a condition mounted on the motorcycle is viewed from above. According to this construction, the pair of the grooved portions, when viewed in a top plane view, are of a shape tapering in a rearward direction. This tapering shape coincides with the planar shape of the standard fuel tank in which the width gradually decreases from an anteroposterior or longitudinal intermediate portion to a rear portion thereof and, therefore, the appearance of the fuel tank is caused to increase.

In the practice of the present invention, a pair of side hill portions are preferably defined laterally outwardly of the corresponding grooved portions, in which case a distance W2 between those hill portions may be chosen to be within the range of 0.30 to 0.60 times the tank maximum width Wm at a front end of each of the side hill portions and within the range of 0.10 to 0.40 times the tank maximum width Wm at a rear end of each of the side hill portions. Accordingly, thanks to the use of the pair of the side hill portions provided laterally outwardly of the pair of the grooved portions, it is possible to easily secure a desired fuel tank capacity, and also the rigidity thereof can be increased. Also, if the distance W2 between the side hill portions is less than 0.10 times the maximum tank width Wm at the front ends or the distance W2 is less than 0.30 times the maximum tank width Wm at the rear ends, the distance W2 is rendered to be too small enough to increase a surface other than that and, therefore, the rigidity of that surface does not increase. On the other hand, if the distance W2 exceeds 0.60 times the tank maximum width at the front ends or exceeds 0.40 times the tank maximum width at the rear ends, the distance W2 is rendered to be too large and, therefore, the rigidity of the fuel tank cannot be increased sufficiently at the low hill portion where the flatness of the tank top surface is not lowered.

In the practice of the present invention, each of the grooved portions preferably has a longitudinal length L1 that is within the range of 0.30 to 0.75 of a tank entire length. Accordingly, both securement of the desired tank capacity and increase of the rigidity can be obtained. In other words, if the longitudinal length L1 of the grooved portions is less than 0.30 of the tank entire length, the grooved portions is rendered to be too short and, therefore, the rigidity will not be increased sufficiently. On the other hand, if the longitudinal length L1 of the grooved portions exceeds 0.75 times the tank entire length, the grooved portions is rendered to be too long and, therefore, the tank capacity will be reduced. The tank entire length referred to hereinbefore and hereinafter should be understood as meaning the longitudinal length measured when the fuel tank is mounted on the motorcycle.

In the practice of the present invention, each of the grooved portions preferably has a depth that is within the range of 1.5 to 3.0 mm. Accordingly, each of the grooved portions can be set to have a depth desirable for achieving the securement of the desired tank capacity and increasing of the rigidity. In other words, if the depth of the grooved portions is less than 1.5 mm, the grooves are too shallow enough to fail the increase of the rigidity. On the other hand if the depth of each of the grooved portion exceeds 3.0 mm, the grooved portions are too deep enough to cause reduction of the tank capacity. It is to be noted that the depth of each of the grooved portions referred to above and hereinafter means a distance from the tank top surface to the deepest portion of each of the grooved portion as measured in the previously discussed transverse sectional shape.

In the practice of the present invention, each of the grooved portion preferably extends continuously from a location in the vicinity of an annular concaved area defined around a fuel filler opening in the tank top portion to a rear end portion of the tank principal portion excluding a seat overlap area that is covered by the rider's seat. In such case, a front end of each of the grooved portion preferably lies rearwardly of the annular concaved area around the fuel filler opening and is defined in a region spaced 5 to 20 mm in a direction radially outwardly from the annular concaved area. Accordingly, even when the rear half portion of the tank principal portion is rendered to be a flat surface, not an outwardly bulged curved surface, the rigidity of this rear half portion increases. It is to be noted that the position "rearwardly of the annular concaved area around the fuel filler opening" is intended to means a position spaced a distance of 5 to 15 mm rearwardly of a rear end edge of the fuel filler opening.

In the practice of the present invention, a fuel reserving space is preferably defined by a tank top plate and a tank bottom plate, in which case the tank top plate is divided into two plate segments on left and right sides, and those plate segments are welded together at a widthwise intermediate portion having a center hill portion positioned between the pair of the grooved portions. The fuel tank is generally fabricated by connecting together a tank top plate and a tank bottom plate each prepared from a metal plate such as, for example, a relatively thin steel plate of about 0.8 mm in thickness. In this case, fabrication of the entire top plate of a shape considerably bulged outwardly by means of a squeezing press work using a single metal plate is not easy to achieve. Accordingly, it may occur that the fuel tank is fabricated by abutting top half plates, which have been so divided leftwardly and rightwardly, together and welding them together subsequently. In such case, a widthwise intermediate portion may be susceptible to reduction in strength when welding is applied. According to the above feature, the fuel tank top plate can have an increased rigidity due to the pair of grooved portions. Also, since the joint so formed by the welding is formed in the center hill portion between the pair of the grooved portions, a grinding and finishing work of the joint can be facilitated as compared with the joint formed inside the grooved portion.

In the practice of the present invention, the tank top portion is preferably provided with an annular concaved area around a fuel filler opening, and a linearly inclined portion may then be defined in a laterally intermediate region rearwardly of the tank top portion in the top surface. In such case, the linearly inclined portion has a longitudinal length L2 that is within the range of 0.2 to 0.35 times a tank entire length and a length L1 from a front end of the fuel tank to a center of the annular concaved area may be within the range of 0.35 to 0.45 times the tank entire length. According to this construction, since the linearly inclined portion is formed rearwardly of the tank top portion, an undesirable contact of the rider with the top surface of the fuel tank can be avoided even when the position at which the rider is seated displaces during an abrupt deceleration.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
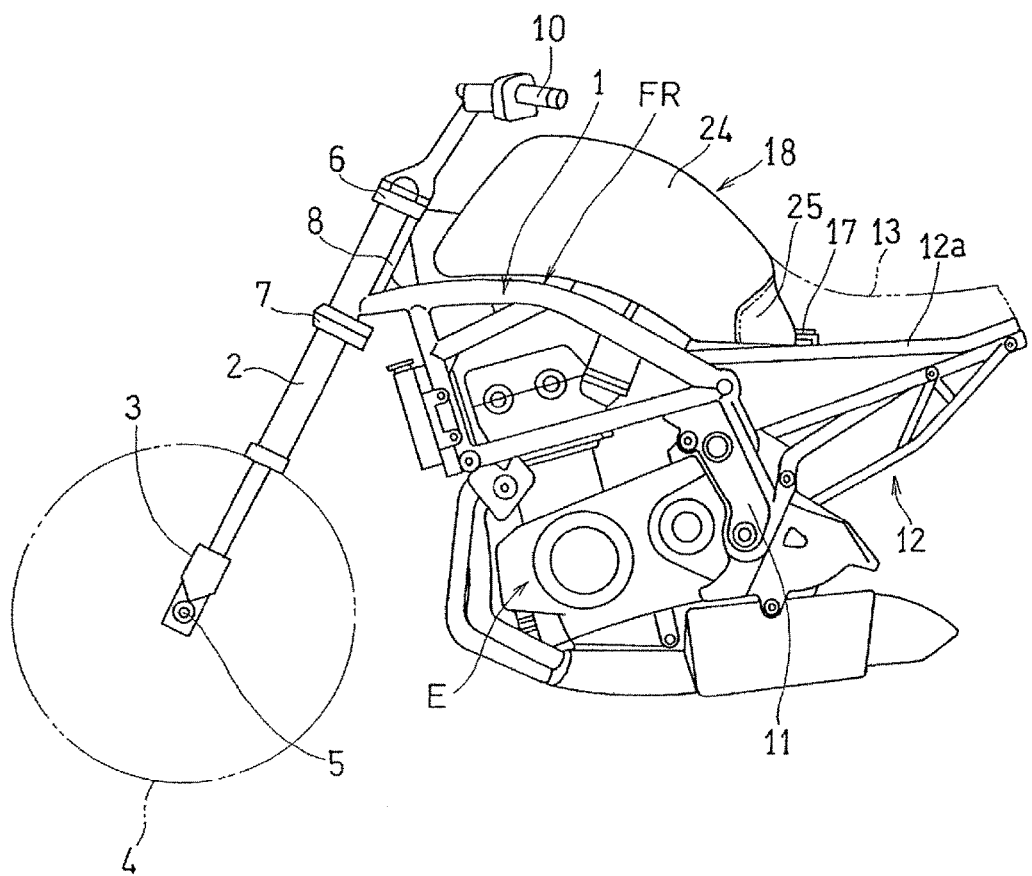
FIG. 1 is a side view showing a front half portion of a motorcycle that is equipped with a fuel tank designed in accordance with a preferred embodiment of the present invention.

Hereinafter, the present invention will be described in connection with a preferred embodiment thereof with particular reference to the accompanying drawings. Referring now to FIG. 1, a motorcycle embodying the present invention includes a main frame 1 forming a front half portion of a vehicle frame structure FR. A front fork 2 is supported on a front end of the main frame 1, and a front wheel 4 is supported by a bottom casing 3, provided in a lower end portion of the front fork 2, through an axle 5. The front fork 2 is leftwardly and rightwardly pivotally supported by a head pipe 8 at a front end of the main frame 1 together with an upper bracket 6 and a lower bracket 7 both supporting the front fork 2, and a handlebar 10 is fitted to the upper bracket 6.

On the other hand, a swingarm bracket 11 is secured to a rear end lower portion of the main frame 1, and a swingarm for supporting a rear wheel, both not shown, is pivotally supported by the swingarm bracket 11. A combustion engine E, which provides a drive source for the rear wheel, is supported at an intermediate lower portion of the main frame 1.

The main frame 1 has a rear portion connected with a rear frame 12 forming a rear half portion of the vehicle frame structure FR, and a rider's seat 13 and a fellow passenger's seat (not shown) positioned rearwardly thereof are supported by a seat rail 12a forming an upper portion of the rear frame 12. A fuel tank 18 is positioned between the head pipe 8 and the rider's seat 13, and is supported by an upper portion of the main frame 1, that is, a vehicle upper portion.

Figure 2:
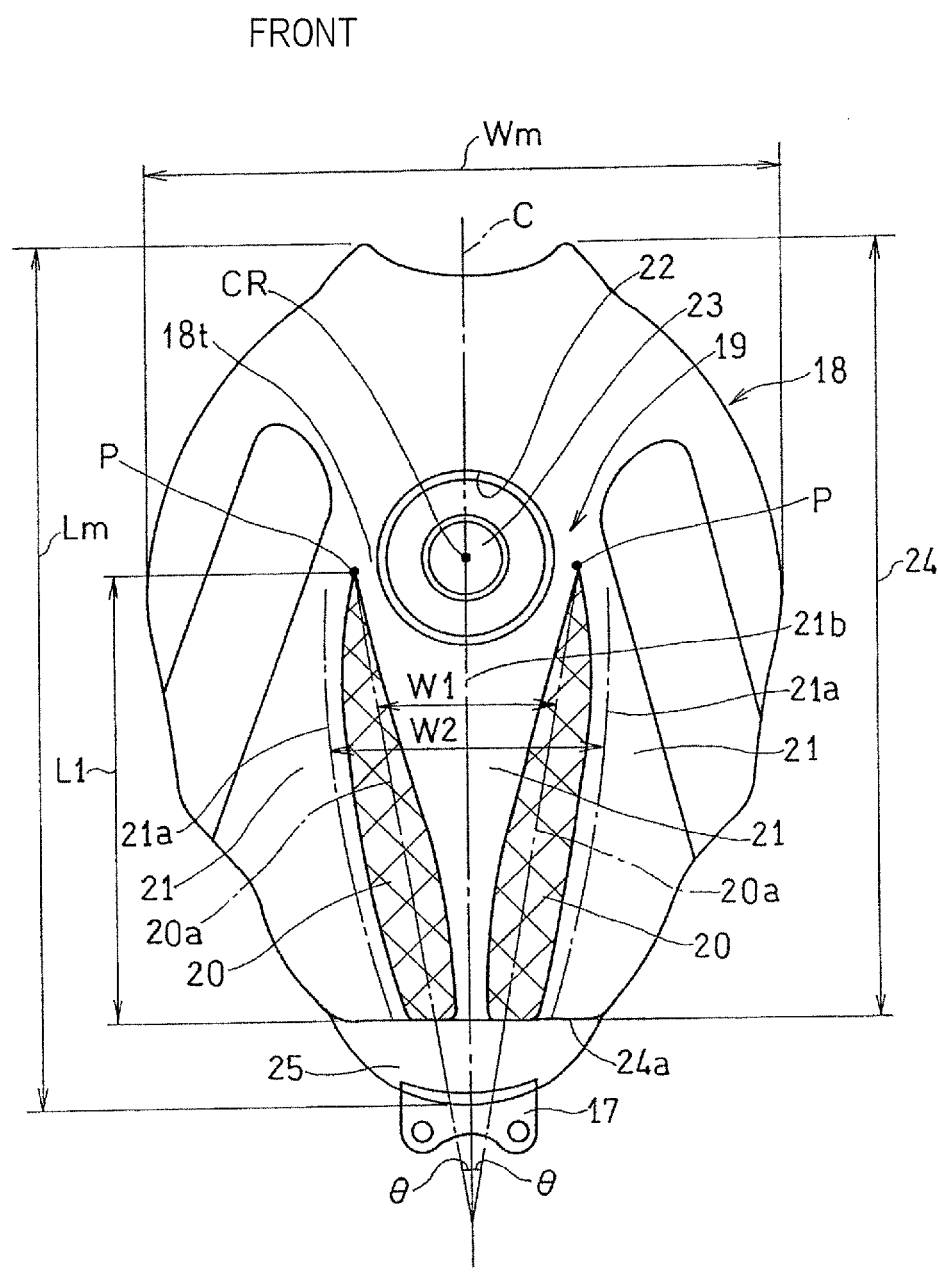
FIG. 2 is a top plane view of the fuel tank shown in FIG. 1.

FIG. 2 illustrates a top plane view showing the fuel tank, then mounted on the motorcycle, as viewed from above. A tank top surface 19, which is an upper portion of an outer surface of the fuel tank 18, is formed with a pair of grooved portions 20 and 20 extending substantially in a forward and rearward direction or longitudinal direction. The grooved portions 20 and 20 are positioned symmetrically on leftward and rightward sides relative to an anteroposterior center plane or longitudinal center plane C lying along an anteroposterior center line or longitudinal center line. As will be detailed later, each of the grooved portions 20 and 20 has its transverse sectional shape so defined as to depict a smoothly extending curved line. In FIG. 2, for the sake of brevity, the grooved portions 20 and 20 are shown cross-hatched and, in the practice of the embodiment now under discussion, the pair of the grooved portions 20 and 20 are linearly inclined while being tapered in the rearward direction.

The distance between the grooved portions 20 and 20 of the pair discussed above, that is, the distance W1 between respective groove bottom lines 20a and 20a, each running with a respective center point (groove bottom) of the corresponding grooved portion 20 and 20, is so set as to be within the range of 0.25 to 0.40 times a tank maximum width Wm at front ends of those grooved portions 20 and 20. Preferably, the distance W1 referred to above is within the range of 0.28 to 0.38 times the tank maximum width Wm. At respective rear ends of the grooved portions 20 and 20, the distance W1 is so set as to be within the range of 0.08 to 0.35 times the tank maximum width Wm and preferably within the range of 0.10 to 0.15 times the tank maximum width Wm. In the practice of the embodiment shown in FIG. 2, the distance W1 is chosen to be 0.35 times the tank maximum width Wm at the front end of each grooved portion 20 and 0.11 times the tank maximum width Wm at the rear end of each grooved portion 20. Although the groove bottom line 20a is shown as extending straight in the present embodiment when viewed in a top plan view, it may be a curved line.

Relative to the longitudinal center plane C, each of the grooved portions 20 extends having been tilted at an angle within the range of 5 to 15° when viewed in a top plan view as shown in FIG. 2. In other words, the angle of inclination θ of each of the groove bottom line 20a in the respective grooved portion 20 is within the range of 5 to 15° and, preferably, within the range of 7 to 13°, relative to the longitudinal center plane C. In this embodiment now under discussion, the angle of inclination θ is chosen to be 10°. It is, however, to be noted that the angle of inclination θ may be zero, that is, the grooved portions 20 and 20 may extend parallel to each other.

Side hill portions 21 and 21 are formed laterally outwardly of the pair of the grooved portions 20 and 20 and a single center hill portion 21 is formed between the neighboring grooved portions 20 and 20. Each of those hill portions 21 is so formed as to have a transverse sectional shape represented by a smooth curved line as will be detailed later. In the embodiment as shown in FIG. 2, only respective crest lines 21a and 21a and 21b each representing top of the corresponding hill portion 21 are shown for the sake of brevity.

The distance W2 between the hill portions 21 and 21, which is the distance between the crest lines 21a and 21a on the lateral outer sides is so set as to be within the range of 0.30 to 0.60 times the tank maximum width Wm, that is, W2=0.30-0.60 Wm, at a front end of each hill portion 21. It is however preferred that the distance W2 be within the range of 0.40 to 0.55 times the maximum tank width Wm. At a rear end of each hill portion 21 and 21, the distance W2 is so set as to be within the range of 0.10 to 0.40 times the tank maximum width Wm, and preferably within the range of 0.15 to 0.30 Wm. In the embodiment as shown in FIG. 2, the distance W2 is chosen to be 0.45 Wm at the front end of each grooved portion 20 and 0.26 Wm at the rear end thereof. The distance W2 referred to above changes in such a manner as to gradually decrease in the rear direction, following a laterally outwardly bulged curved line.

The fuel tank 18 has a rear end portion to which a support bracket 17 supported by the seat rail 12a (shown in FIG. 1) through a fastening member is fitted. Each grooved portion 20 has an anteroposterior length or longitudinal length L1 that is so set as to be within the range of 0.30 to 0.75 times a tank entire length Lm excluding the support bracket 17. It is, however, to be noted that the longitudinal length L1 is to be chosen preferably within the range of 0.40 to 0.65 of the tank entire length Lm excluding the support bracket 17. As clearly shown in FIG. 4 showing a side view of the fuel tank, the longitudinal length L1 of each grooved portion 20 and the tank entire length Lm, both referred to above, stand for respective lengths as measured in a horizontal direction of the fuel tank 18 in a posture with the fuel tank 18 mounted on the motorcycle.

Figure 3:
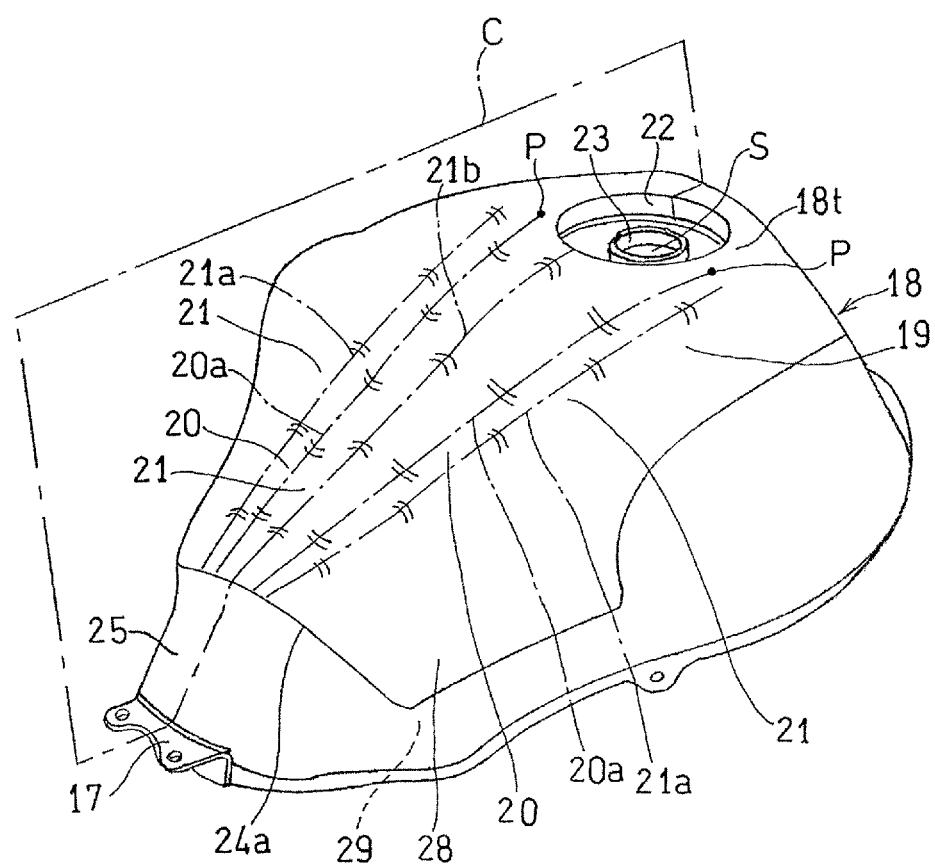
FIG. 3 is a perspective view showing the fuel tank as viewed from a rear side.

The fuel tank 18 has a tank principal portion 24 that excludes a seat overlap area 25 covered by the rider's seat 13 shown in FIG. 1. FIG. 3 is a perspective view of the fuel tank 18 as viewed slantwise from rear. In FIG. 3, the pair of the grooved portions 20 and 20 extend continuously from a position P in the vicinity of an annular concaved area 22, situated around a fuel filler opening defined in a tank top portion 18t, to a rear end portion 24a of the tank principal portion 24. The position P of the front end of each grooved portion 20 is preferably defined at a location rearwardly of the geometric center CR of the filler annular concaved area 22 and within a region spaced a distance of 5 to 20 mm in a radially outward direction away from the annular concaved area 22 around the fuel filler opening. Preferably the position P is defined at a location laterally outwardly of the filler annular concaved area 22 within the above region and spaced a distance of 0 to 30 mm away from the geometric center CR of the annular concaved area 22. The rear end of each grooved portion 20 may however be defined at a location somewhat forwardly of a rear end portion 24a of the tank principal portion 24.

The fuel filler opening referred to above is designated by 23 and opens within the annular concaved area 22 in communication with a fuel reserving chamber S within the tank. The annular concaved area 22 is closed by a filler cap not shown. This fuel tank 18 includes a tank top plate 28 and a tank bottom plate 29 (both best shown in FIG. 4), the tank top and bottom plates 28 and 29 being welded together to define the fuel reserving space S within the fuel tank 18. Each of the tank top and bottom plates 28 and 29 is made of a metal plate such as, for example, a steel plate having a relatively small plate thickness, say, about 0.8 mm.

Figure 4:
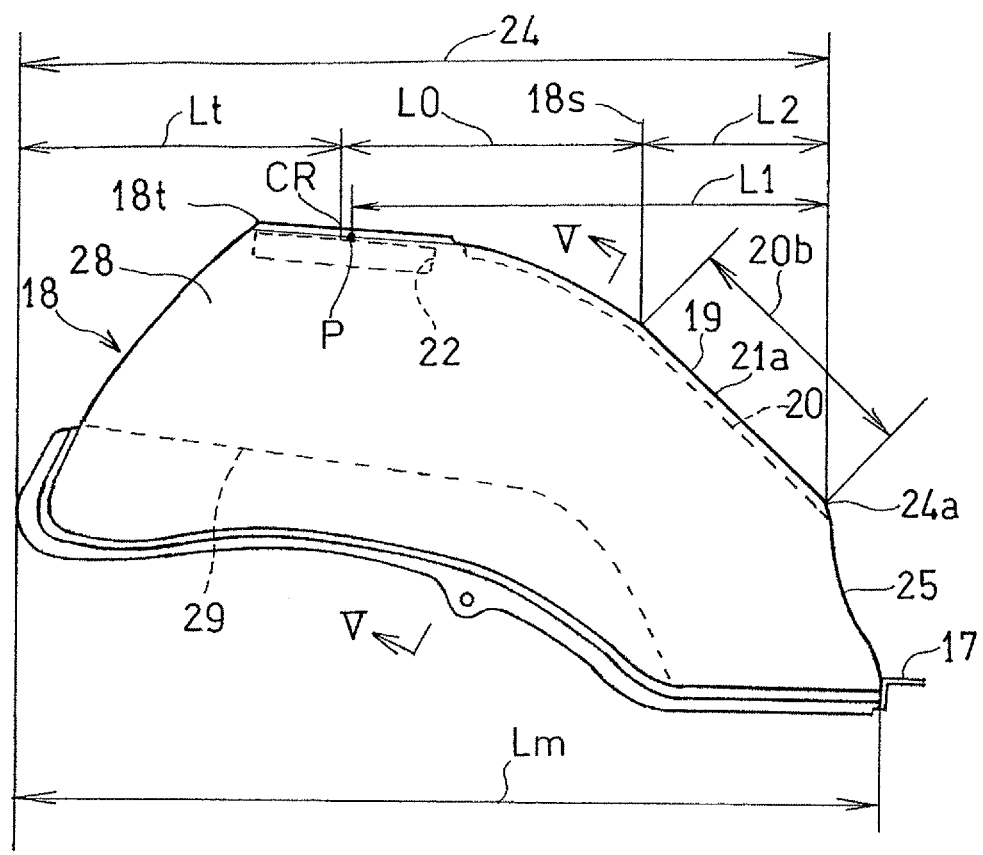
FIG. 4 is a side view showing the fuel tank.

As shown in FIG. 4, a linearly inclined portion 20b is formed in the tank top surface 19 at a location within a laterally intermediate region defined rearwardly of the tank top portion 18t where the filler annular concaved area 22 is defined. In this linearly inclined portion 20b, the three hill portions 21 shown in FIG. 2 have respective hill tops (crests) held at the same level and, accordingly, the corresponding crest lines 21a, 21a and 21b, when the fuel tank 18 is viewed from lateral in FIG. 4, coincide substantially with each other as if a single crest line were to be presented. The linearly inclined portion 20b referred to above is so formed as to lie in, for example, a region ranging from a rear location 18s, which is spaced a predetermined distance L0 in a direction rearwardly of the tank top portion 18t, to the rear end portion 24a of the tank principal portion 24. The linearly inclined portion 20b is inclined linearly downwardly towards the rear when viewed from lateral. It is to be noted that this linearly inclined portion 20b may, however, terminate at a location somewhat forwardly of the rear end portion 24a of the tank principal portion 24.

In the linearly inclined portion 20b referred to above, a pair of the side hill portions 21 and 21 on the laterally outer side have the same height. This linearly inclined portion 20b has an anteroposterior length or longitudinal length L2 that is so set as to be within the range of 0.20 to 0.35 times the tank entire length Lm. The longitudinal length L2 is, however, preferred to be within the range of 0.21 to 0.30 times the tank entire length Lm. The predetermined distance L0 referred to previously is within the range of 0.20 to 0.45 times the tank entire length Lm, and, preferably, within the range of 0.25 to 0.40 times the tank entire length Lm.

The tank top portion 18t includes the filler annular concaved area 22 and an outer peripheral portion neighboring such concaved area 22, and a center of the tank top portion 18t is aligned with the geometric center CR. The length Lt as measured from the front end of the fuel tank 18 to the geometric center CR is so chosen as to be within the range of 0.35 to 0.45 times the tank entire length Lm.

Figure 5:
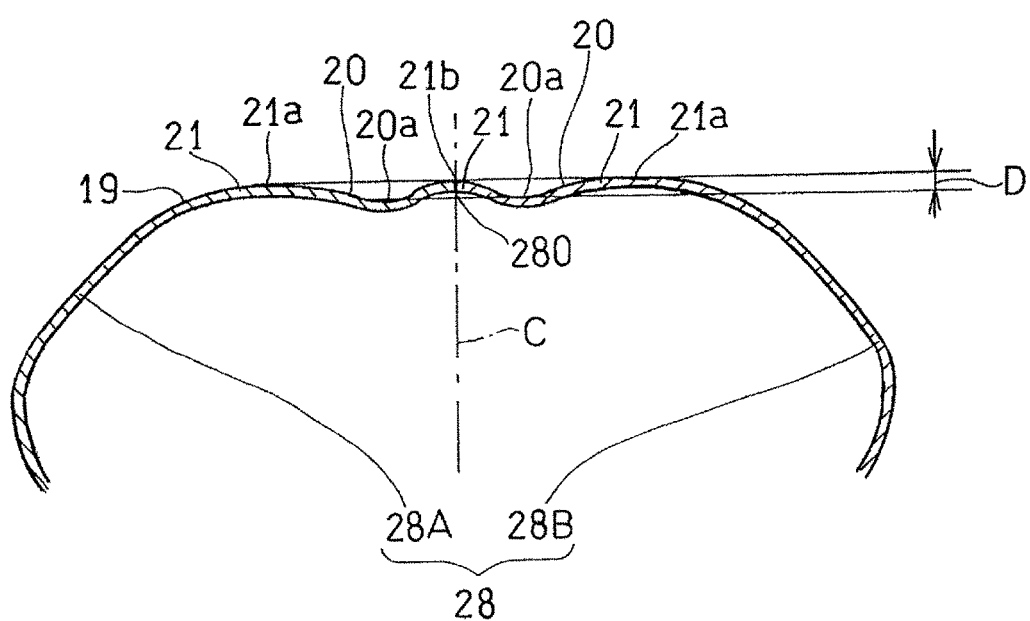
FIG. 5 is a cross sectional view taken along the line V-V in FIG. 4.

Referring to FIG. 5 showing a cross sectional view taken along the line V-V in FIG. 4, each of the side grooved portions 20 and 20 on the laterally outer side has a depth D so set as to be within the range of 1.5 to 3.0 mm, preferably within the range of 1.7 to 2.5 mm and more preferably within the range of 1.8 to 2.2 mm. This transverse sectional surface shown in FIG. 5 is a surface extending in a widthwise direction of the vehicle and lying perpendicular to the tank upper surface 19. The transverse sectional shape is a shape appearing on the above described transverse sectional surface. FIG. 5 shows a cross sectional shape of a portion of the fuel tank 18 where the pair of the grooved portions 20 and 20 are formed. As shown in FIG. 5, the pair of the grooved portions 20 and 20 and the three hill portions 21 are all so formed as to be represented by a curved line of a smooth wavy shape. In other words, the transverse sectional shape of each of the grooved portions 20 and 20 is represented by a curved line bulged inwardly of the fuel tank whereas the transverse sectional shape of each of the hill portions 21 is represented by a curved line that is bulged outwardly of the fuel tank.

The tank top plate 28 shown in FIG. 3 is made up of two top plate segments 28A and 28B that are divided laterally on left and right sides, the two top plate segments 28A and 28B being welded together as at a weld joint 280 which extends along the longitudinal center plane C and which lies on a tank widthwise intermediate portion. Although the tank bottom plate 29 in the present embodiment is prepared from a single plate member, it may be divided into two so that the tank bottom plate 29 may be formed in a manner similar to the tank top plate 28, as discussed above, with two bottom plate segments welded together by means of welding.

Because of the provision of the pair of the grooved portions 20 and 20 that extend in the longitudinal direction as shown and described with particular reference to FIG. 2, the fuel tank 18 has an increased rigidity and, therefore, generation of the resonance phenomenon occurring in the tank top surface 18, which is caused by vibration taking place during the travelling, can be suppressed effectively. Also, as compared with the tank having a single groove of a large width, reduction of the tank capacity is minimized and, therefore, a desired tank capacity can be easily obtained. Since, as shown in FIG. 3, the pair of the grooved portions 20 and 20 are formed at a location rearwardly of the tank top portion 18t, the rigidity of that location rearwardly of the tank top portion 18t is maintained high, and also, the aesthetic feature can be enhanced with this rearward location formed as a flat surface as shown in FIG. 4, not an upwardly bulged curved surface.

Also, since as shown in and discussed with particular reference to FIG. 2, the distance W1 between the grooved portions 20 and 20, which includes the front and rear ends of each grooved portion 20, is so set as to fall within the range of 0.08 to 0.40 times the tank maximum width Wm, an effective increase of the rigidity can be expected. Where the respective distances W1 between the grooved portions 20 and 20 are less than 0.25 times the tank maximum width Wm at the front ends or less than 0.08 times the tank maximum width Wm at the rear ends, the distance W1 is too small to allow the surface other than that to become large, failing to increase the rigidity of that surface. Where the distance W1 is in excess of 0.40 times the tank maximum width Wm at the front ends or in excess of 0.30 times the tank maximum width Wm at the rear ends, the distance W1 is too large and, therefore, at shallow grooved portions where the tank capacity is not reduced, the rigidity of the fuel tank will not be increased sufficiently. Also, as shown in FIG. 5, since the pair of the grooves 20 and 20 are so formed as to have respective transverse surface shapes each depicted by a smoothly curved line, the presence of such grooved portions 20 will not constitute a cause of impairment of the outer appearance.

Each of the grooved portions 20, when viewed in a top plan view, is inclined at an angle of inclination within the range of 5 to 15° relative to the longitudinal center plane C, and therefore, the pair of the grooved portions 20 and 20, when viewed similarly in a top plan view, cooperate to depict a shape tapering in the rearward direction. In contrast thereto, the fuel tank 18 is generally of a shape in which the width is gradually reduced from the longitudinal center portion towards the rear portion. Accordingly, the tapering shape depicted by the grooved portions 20 and 20 coincides with a top plane shape of the fuel tank 18, and the outer appearance of the fuel tank 18 is therefore improved.

In addition, because of the provision of the pair of the side hill portions 21 and 21 provided laterally outwardly of the pair of the grooved portions 20 and 20 as shown in and described with particular reference to FIG. 2, it is possible to secure the desired tank capacity and also to increase the rigidity. Also, where the distance W2 of the side hill portions 21 and 21 on the laterally outer side is less than 0.30 times the tank maximum width Wm at the front ends or less than 0.10 times the tank maximum width Wm at the rear ends the tank maximum width Wm, the distance W2 is too small to increase the surface other than it, failing to increase the rigidity of that surface. Where the distance W2 is in excess of 0.60 times the tank maximum width Wm at the front ends or 0.40 times the tank maximum width Wm at the rear ends, the distance W2 is too large that, when the hill portion 21 is made low enough to avoid reduction of the flatness of the top surface 19, the rigidity of the fuel tank 18 will not be increased sufficiently.

Since as shown in and discussed with particular reference to FIG. 2, the longitudinal length L1 of each of the grooved portion 20 and 20 is so set as to fall within the range of 0.30 to 0.75 times the tank entire length Lm, the desired tank capacity can be obtained, and also the rigidity of the fuel tank can be increased. In other words, where the longitudinal length L1 is less than 0.30 times the tank entire length, the longitudinal length L1 is too small and the rigidity of the fuel tank 18 will not be increased sufficiently. On the other hand, where the longitudinal length L1 is in excess of 0.75 times the tank entire length, the longitudinal length L1 is too large enough to induce reduction of the tank capacity.

Since the depth D of each of the grooved portions 20 and 20 is set as to fall within the range of 1.5 to 3.0 mm as shown in FIG. 4, securement of the desired tank capacity and increase of the rigidity can be obtained. In other words, if the depth of each grooved portion 20 is less than 1.5 mm, the each grooved portion 20 is too shallow and the rigidity will not therefore be increased sufficiently. On the other hand, if the depth of the each grooved portion 20 is in excess of 3.0 mm, the grooved portion 20 will be too deep and the tank capacity will therefore be reduced.

As shown in and discussed with particular reference to FIG. 3, each of the grooved portions 20 and 20 extends continuously from the location immediately rearwardly of the filler annular concaved area 22 in the tank top portion 18$t$ to the rear end portion 24$a$ of the tank principal portion 24 excluding the seat overlap area 25. Accordingly, even when a rear half portion of the tank principal portion 24 is rendered to have the flat linearly inclined portion 20$b$ when viewed from lateral as shown in and discussed with particular reference to FIG. 4, the rigidity of this rear half portion is increased. The provision of the linearly inclined portion 20$b$ at a position rearwardly of the tank top portion 18$t$ is effective to avoid an undesirable contact of the rider with the fuel tank 13 when the seating position of the rider displaces forwardly during an abrupt deceleration.

As shown in and described with particular reference to FIG. 5, the top plate segments 28A and 28B, which result from dividing the tank top plate 28 into two on the left and right sides, are welded together at the widthwise intermediate portion included in the center hill portion 21 between the pair of the grooved portions 20 and 20. Accordingly, since the weld joint 280 is formed on the crest of the center hill portion 21 between the pair of the grooved portions 20 and 20, a work to grind and finish the weld joint 280 can be facilitated as compared with the formation of a joint inside the grooved portions 20.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

8 Head pipe
13 Rider's seat
18 Fuel tank
18$t$ Tank top portion
19 Tank top surface
20 Grooved portion
20$b$ Linearly inclined portion
21 Hill portion
22 Recess around the filler port
24 Tank principal portion
25 Seat overlap area
28 Tank top plate
29 Tank bottom plate
280 Weld joint
C Longitudinal center plane

What is claimed is:

1. A fuel tank for use in a motorcycle that is disposed between a head pipe and a rider's seat, which tank comprises:

a top surface including a pair of grooved portions positioned symmetrically relative to a longitudinal center plane, the pair of the grooved portions being positioned rearwardly of a tank top portion and having a transverse sectional shape depicted by a smoothly curved line, the pair of the grooved portions being formed to extend parallel to the longitudinal center plane or to extend so as to incline relative to the longitudinal center plane with a distance range W1 between bottom lines of the pair of the grooved portions gradually decreasing in a rearward direction, a single center hill portion formed between the pair of the grooved portions; and side hill portions formed laterally outwardly of the pair of the grooved portions, in which the distance range W1 between the bottom lines of the pair of the grooved portions is chosen to be between 0.25 and 0.40 times a tank maximum tank width Wm at front ends of the pair of the grooved portions and between 0.08 and 0.35 times the tank maximum tank width Wm at rear ends of the pair of the grooved portions.

2. The fuel tank for use in the motorcycle as claimed in claim 1, in which each of the pair of the grooved portions is inclined at an angle of inclination between 5° and 15° relative to the longitudinal center plane when viewed in a top plane view.

3. The fuel tank for use in the motorcycle as claimed in claim 1, in which a distance range W2 between the side hill portions being chosen to be between 0.30 and 0.60 times the tank maximum width Wm at a front end of each of the side hill portions and between 0.10 and 0.40 times the tank maximum width Wm at a rear end of each of the side hill portions.

4. The fuel tank for use in the motorcycles as claimed in claim 1, in which each of the pair of the grooved portions has a longitudinal length L1 that is between 0.30 and 0.75 times the tank entire length.

5. The fuel tank for use in the motorcycles as claimed in claim 1, in which each of the pair of the grooved portions extends continuously from a location in the vicinity of an annular concaved area defined around a fuel filler opening in the tank top portion to a rear end portion of a tank principal portion excluding a seat overlap area that is covered by the rider's seat.

6. The fuel tank for use in the motorcycles as claimed in claim 5, in which a front end of each of the pair of the grooved portions lies rearwardly of the annular concaved area around the fuel filler opening and is defined in a region spaced between 5 mm and 20 mm in a direction radially outwardly from the annular concaved area.

7. The fuel tank for use in the motorcycles as claimed in claim 1, in which a fuel reserving space is defined by a tank top plate and a tank bottom plate, the tank top plate being divided into two plate segments on left and right sides, those plate segments being welded together at the single center hill portion positioned between the pair of the grooved portions.

8. The fuel tank for use in the motorcycles as claimed in claim 1, in which the tank top portion is provided with an annular concaved area around a fuel filler opening, and a linearly inclined portion is defined in a laterally intermediate region rearwardly of the tank top portion in the top surface.

9. The fuel tank for use in the motorcycles as claimed in claim 8, in which the linearly inclined portion has a longitudinal length L2 that is between 0.2 and 0.35 times a tank entire length and in which a length Lt from a front end of the fuel tank to a center of the annular concaved area is between 0.35 and 0.45 times the tank entire length.

10. A fuel tank for use in a motorcycle that is disposed between a head pipe and a rider's seat, which tank comprises:

a top surface including a pair of the grooved portions positioned symmetrically relative to a longitudinal center plane, the pair of the grooved portions being positioned rearwardly of a tank top portion and having a transverse sectional shape depicted by a smoothly curved line, the pair of the grooved portions being formed to extend parallel to the longitudinal center plane or to extend so as to incline relative to the longitudinal center plane with a distance range W1 between bottom lines of the pair of the grooved portions gradually decreasing in a rearward direction, in which the distance range W1 between the bottom lines of the pair of the grooved portions is chosen to be between 0.25 and 0.40 times a tank maximum tank width Wm at front ends of the pair of the grooved portions and between 0.08 and 0.35 times the tank maximum tank width Wm at rear ends of the pair of the grooved portions, and in which each of the pair of the grooved portions has a depth that is between 1.5 mm and 3.0 mm.

11. A fuel tank for use in a motorcycle that is disposed between a head pipe and a rider's seat, which tank comprises:

a top surface including a pair of grooved portions positioned symmetrically relative to a longitudinal center plane, the pair of the grooved portions being positioned rearwardly of a tank top portion and having a transverse sectional shape depicted by a smoothly curved line, the pair of the grooved portions being formed to extend parallel to the longitudinal center plane or to extend so as to incline relative to the longitudinal center plane with a distance range W1 between bottom lines of the pair of the grooved portions gradually decreasing in a rearward direction, in which the distance range W1 between the bottom lines of the pair of the grooved portions is chosen to be between 0.25 and 0.40 times a tank maximum tank width Wm at front ends of the pair of the grooved portions and between 0.08 and 0.35 times the tank maximum tank width Wm at rear ends of the pair of the grooved portions, in which the tank top portion is provided with an annular concaved area around a fuel filler opening, and a linearly inclined portion is defined in a laterally intermediate region rearwardly of the tank top portion in the top surface, and in which the linearly inclined portion has a longitudinal length L2 that is between 0.2 and 0.35 times a tank entire length and in which a length Lt from a front end of the fuel tank to a center of the annular concaved area is between 0.35 and 0.45 times the tank entire length.

* * * * *